United States Patent [19]
Gray

[11] Patent Number: 5,375,476
[45] Date of Patent: Dec. 27, 1994

[54] STUCK PIPE LOCATOR SYSTEM

[75] Inventor: Kevin L. Gray, Webster, Tex.

[73] Assignee: Wetherford U.S., Inc., Houston, Tex.

[21] Appl. No.: 129,660

[22] Filed: Sep. 30, 1993

[51] Int. Cl.⁵ .................................................. G01L 3/02
[52] U.S. Cl. ................................. 73/862.331; 73/151; 73/863.328
[58] Field of Search ................... 73/862.328, 862.331, 73/862.392, 151; 166/255, 301; 175/40; 324/221

[56] References Cited

U.S. PATENT DOCUMENTS

| | | | |
|---|---|---|---|
| 2,316,361 | 4/1943 | Piety | 250/83.6 |
| 2,430,757 | 11/1947 | Conrad et al. | 177/351 |
| 2,530,309 | 11/1950 | Martin | 73/151 |
| 2,550,964 | 5/1951 | Brookes | 73/151 |
| 2,698,920 | 1/1955 | Gieske | 324/34 |
| 2,716,890 | 9/1955 | Martin | 73/151 |
| 2,717,039 | 9/1955 | Gieske | 166/65 |
| 2,814,019 | 11/1957 | Bender | 324/34 |
| 2,817,808 | 12/1957 | Gieske | 324/34 |
| 2,869,072 | 1/1959 | Gieske | 324/34 |
| 2,902,640 | 9/1959 | Foster | 324/221 |
| 3,004,427 | 10/1961 | Berry | 73/151 |
| 3,006,186 | 10/1961 | Berry | 73/151 |
| 3,095,736 | 7/1963 | Rogers | 73/151 |
| 3,762,218 | 10/1973 | Davis | 73/151 |
| 3,942,373 | 3/1976 | Rogers | 73/151 |
| 3,994,163 | 11/1976 | Rogers | 73/151 |
| 4,402,219 | 9/1983 | Hache | 73/151 |
| 4,515,010 | 5/1985 | Weido et al. | 73/151 |
| 4,695,957 | 9/1987 | Peltier | 73/151 X |
| 4,708,204 | 11/1987 | Stroud | 73/151 X |
| 4,766,764 | 8/1988 | Trevillion | 73/151 |
| 4,907,460 | 3/1990 | Taniguchi et al. | 73/862.331 |
| 5,236,048 | 8/1993 | Skinner et al. | 166/382 |

OTHER PUBLICATIONS

"Oilfield Services And Manufactured Products" Homco 1984-1985 Catalog, note p. 4; 1984.

Primary Examiner—Richard E. Chilcot, Jr.
Assistant Examiner—Elizabeth L. Dougherty
Attorney, Agent, or Firm—Guy McClung

[57] ABSTRACT

A system for locating a stuck pipe is disclosed which, in one aspect, includes a tool with a removable bi-sensor cartridge assembly which has at least two autonomous independent sensors, one for sensing torsion and one for sensing tension. The sensors may also be used to indicate temperature downhole. A method is disclosed for locating stuck pipe using such a sensor and using a slip joint according to the present invention. In one aspect the slip joint has a housing, a mandrel, and a two conductor coil cord assembly.

19 Claims, 8 Drawing Sheets

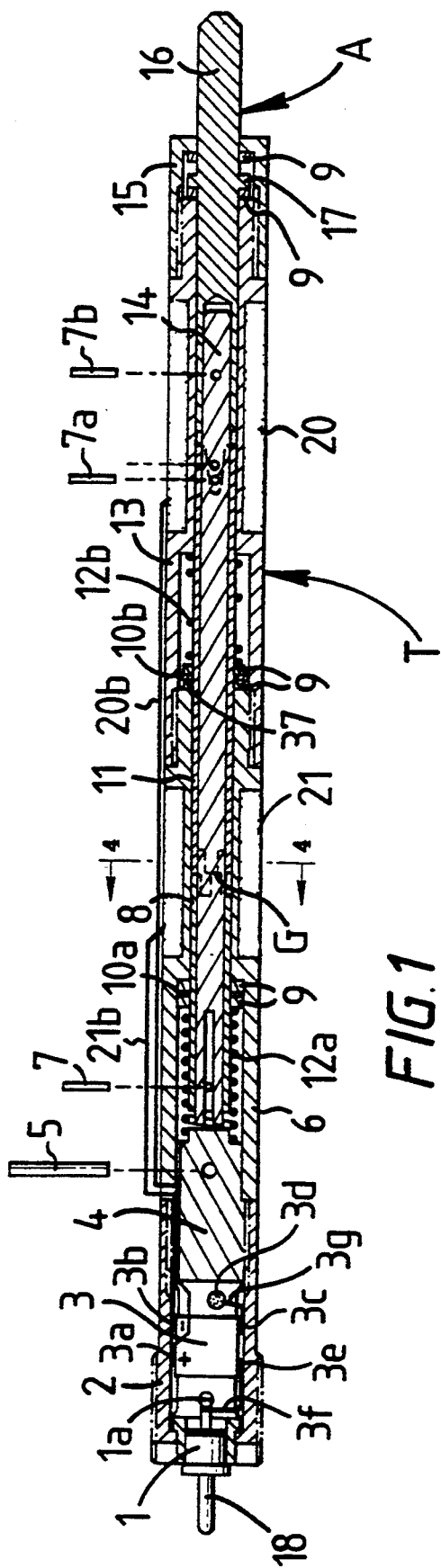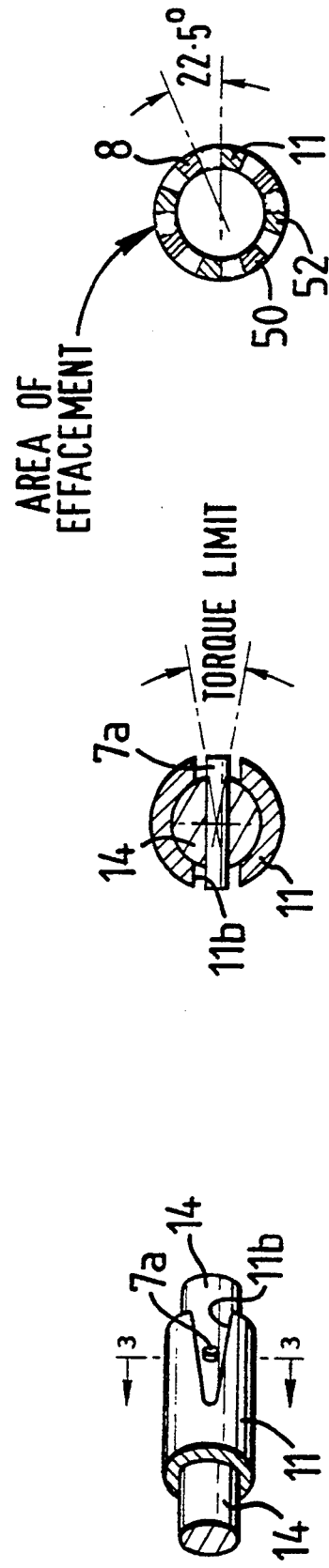

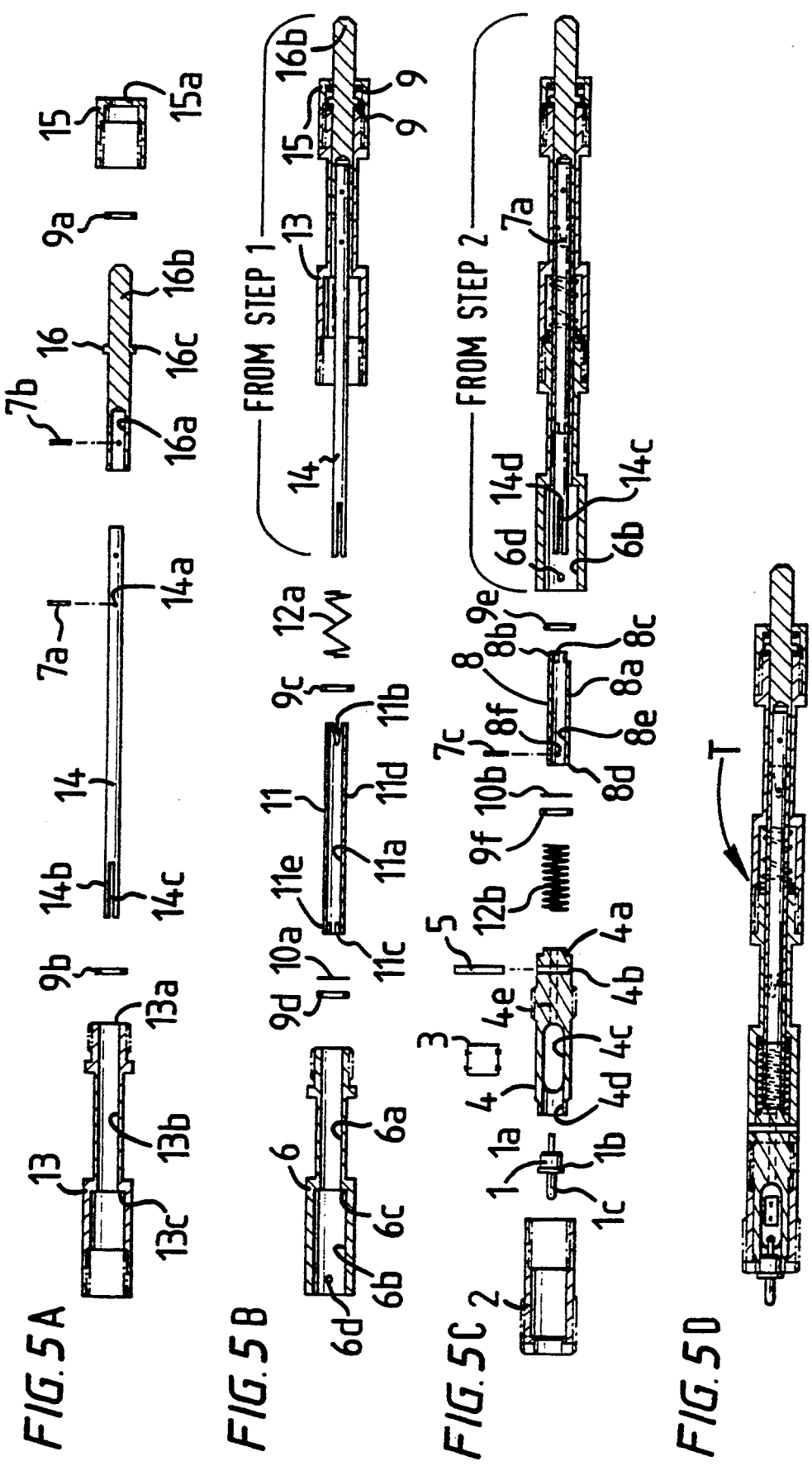

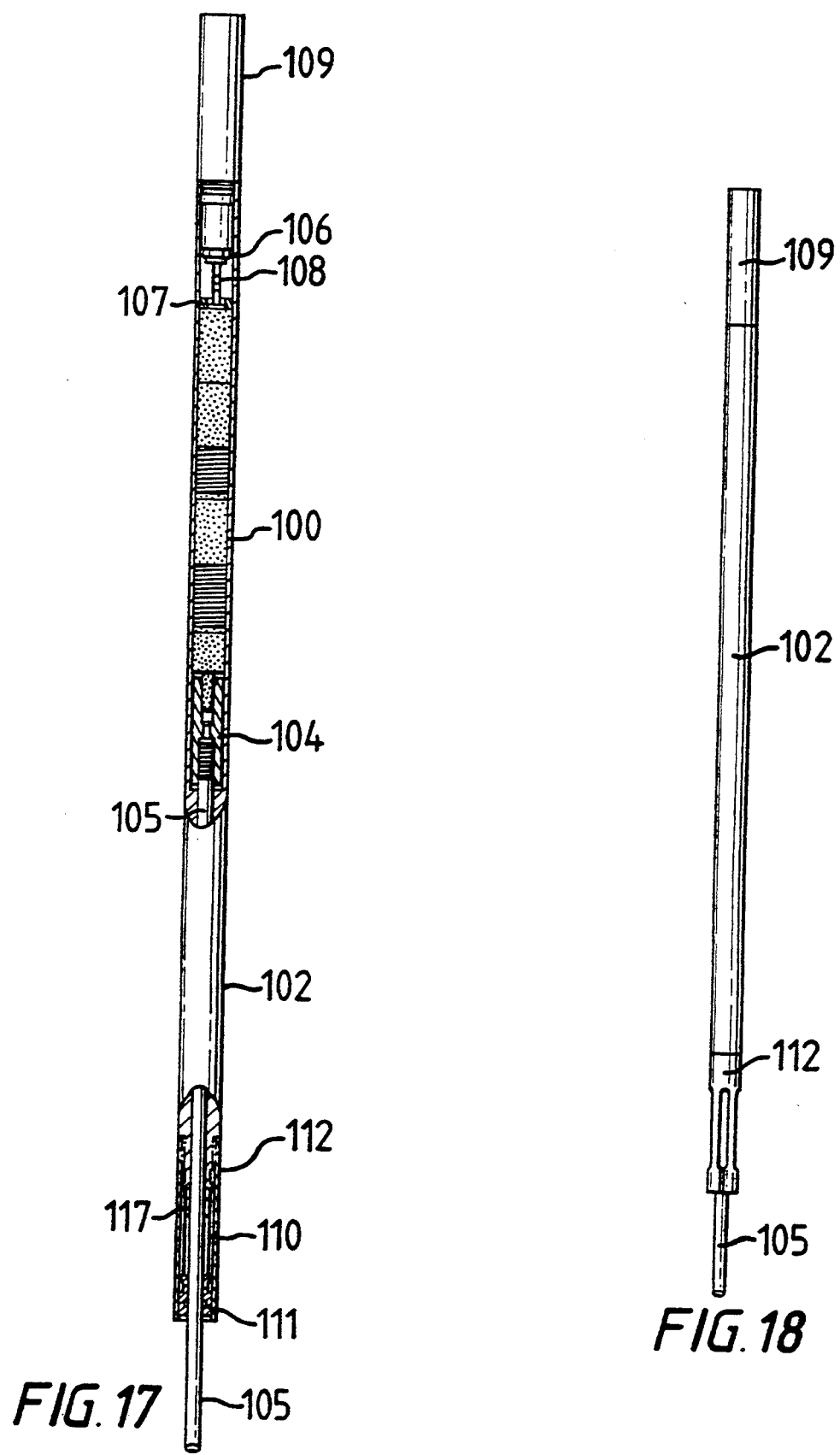

STUCK PIPE LOCATOR SYSTEM

BACKGROUND OF THE INVENTION

1. Field of the Invention

This invention is related to apparatuses, systems, and methods for locating the point at which a pipe, e.g. a drill string, is stuck in an opening or a hole, e.g. in a hollow tubular or in a borehole.

2. Description of Related Art

It is useful in well bore operations to know the point at which one tubular is stuck within another or within a wellbore. Such knowledge makes it possible to accurately locate tools or other items above, adjacent, or below the point at which the tubular is stuck. The prior art includes a variety of apparatuses and methods for ascertaining the location of stuck pipe. In general these methods employ an instrument which is lowered into a tubular to sense deformations in the tubular when torsion or tension is applied to it. Readings taken at successive depths are recorded analyzed and interpreted to determine the depth at which the tubular is stuck.

There are four general types of sensing methods employed in the oil-field industry for detecting stress-/strain or movement in pipe to determine a stuck pipe location. Three of these methods use only one sensor to detect both rotational and lineal displacement of pipe, while the fourth uses two sensors. One of the methods employs no down-hole electronics such as an oscillator.

One method employs an apparatus to which pipe is magnetically coupled and which detects pipe movement by sensing a change in magnetic flux. Forces applied to the pipe modify the characteristics of the coupled magnetic field which are noted at the surface with the aid of a downhole oscillator.

A second method, described in U.S. Pat. No. 3,006,186, employs an inductor that is mechanically attached to pipe at two points. The inductor is so arranged to have within it a gap in permeable material. The gap is modified in dimension in relation to any pipe movement and the modifications are registered at the surface. This method does not use a downhole oscillator to measure torque or stretch of pipe, but it responds nonlinearly to pipe movement and employs only one sensor.

A third method, described in U.S. Pat. No. 3,095,736, employs a single inductor that is mechanically attached to pipe at two points. This single sensor equipped design operates linearly and responds to mechanical movement by physically altering the permeability of the inductor which is then coupled to a downhole oscillator that changes frequency in relation to the pipe stress or strain measured.

A fourth method, described in U.S. Pat. No. 4,402,219, employs two sensors, independent of each other, which are mechanically attached to pipe at two points. This system uses an LVDT (linear voltage differential transformer) to detect linear displacement of pipe (stretch/compression); and uses a RVDT (rotary voltage differential transformer) to detect rotational movement. These types of sensors require sustained excitation from a stable oscillator, and in freepoint wireline applications, require the oscillator, and other electronics, to be located downhole.

There has long been a need for an efficient and an effective stuck pipe locator and a method for location stuck pipe. There has long been a need for such devices, and methods which overcome the problems associated with prior art devices. There has long been a need for such devices and methods which overcome the problems associated with the use of a single sensor and with the use of powered downhole electronics. There has long been a need for such devices and methods which overcome calibration and repair problems encountered with certain prior art devices. There has long been a need for such devices and methods which accurately determine the temperature at downhole locations in a borehole.

SUMMARY OF THE PRESENT INVENTION

The present invention, in one aspect, teaches a tool for locating stuck pipe, the tool having a housing and an assembly therein with two (or more) autonomous, independent sensors disposed within the assembly, including at least one sensor for detecting rotational or radial motion (torsion), and at least one other sensor for discerning lineal or axial displacements (tension). The device operates, preferably from a single conductor wireline cable without the need for downhole powered electronics such as an oscillator or an amplifier. The two sensors are disposed in a sub-assembly that constitutes a replaceable cartridge that is easily installed in and removed from the housing. The cartridge is passively interrogated from the surface.

For sensing stretch, or tensional displacement, in one embodiment a solenoidal sensor coil with a moving core is employed. The cartridge is capable of measuring stretch or compression of pipe and is intrinsically (naturally) immune from sensing rotational motion. The coil has a non-linear response to stretch displacement; but, over a small restricted range of motion, (e.g. preferably up to 0.030" in either direction and most preferably up to but not exceeding 1/16" in either direction) the output is approximately linear.

For sensing torsion, a torque sensor is used which has a rotary transducer that changes its output linearly with input rotation or torque. It is comprised preferably of two machined rotary sensor pieces placed in the core of a solenoidal coil. A pin-and-slot design feature of a sensor shaft and one of the rotary sensors serves to isolate the torque sensor from any stretch or "stroke" displacement. Torque rotation can be sensed either in the left hand or right hand sense.

In one preferred embodiment the cartridge with the two sensors has both a mechanical reset feature and an electrical reset feature for the torque sensor, and a mechanical reset feature for the stretch sensor. A slot on one of the rotary sensor pieces is engaged with an alignment pin in a sensor shaft within the cartridge and operates to reset the torque transducer. Torque reset occurs when the tool is stroked manually (i.e. by lowering and raising the wireline cable) or by the electromagnetic engagement of the stretch sensor coil which creates a force which moves one of the rotary sensor pieces. The stretch sensor coil provides sufficient electromagnetic force to reset the torque sensor and is electrically energized by surface equipment. Electrical connections are, preferably, made to a single pin contact at the top of the cartridge and to its case (ground connection).

Mechanically, the cartridge is, in one respect, screwed into the housing. A pin at the bottom of the assembly is then mechanically connected to pipe through the use of a mating connector, shaft, and fluid seal of the housing. Devices according to this invention preferably require no calibration after installation in the housing and require no calibration downhole.

A surface interrogator, (e.g. a bridge rectifier, an electronic diode switching bridge or their equivalents) is used in certain embodiments to process sensor information for independent interrogation of each sensor by surface equipment. The diode bridge negates the need for powered downhole electronics and also permits interrogation from the surface of both downhole sensors over a single conductor wireline cable.

In one embodiment the present invention discloses a sensor for measuring temperature and temperature change downhole in a wellbore due to a coil's resistance and a coil's resistance response to temperature change.

The present invention discloses systems for locating stuck pipe which include, in one aspect: a shot bar; a safety sub connected to the shot bar; a lower anchor device such as a lower magnetic anchor or a tubular with one or more bow springs connected to the safety sub; a sensor as described about connected to the lower anchor device; an upper anchor device connected to the sensor; a slip joint connected to the upper anchor device; one or more sinker bars connected to the slip joint; a collar locator connected to the sinker bar(s); a cable head connected to the collar locator; and a cable extending from the cable head to a signal and/or control system. A slip joint according to the present invention, in one aspect, includes a housing, a mandrel, and a two conductor coil cord assembly.

It is, therefore, an object of at least certain preferred embodiments of the present invention to provide:

New, useful, unique, efficient, nonobvious devices, systems, and methods for determining the location of a stuck tubular, e.g. but not limited to a stuck pipe such as a drill string in a borehole;

Such devices systems, and methods which provide signals indicative of both torsional and tensional deformations;

Such devices, systems and methods which do not require downhole powered electronics;

Such devices, systems and methods which permit independent interrogation of multiple sensors (two or more) via a single conductor cable;

Such devices, systems and methods with a torque sensor which is resettable mechanically and electrically;

Such devices, systems and methods which do not require calibration after installation;

Such devices, systems and methods which are useful to determine temperature and temperature change downhole;

Such devices, systems including an easily replaceable cartridge containing the sensors;

Such devices and methods for the separate and simultaneous detection of torque and/or stretch of a tubular in a wellbore hole, or hollow channel of another tubular; and New, useful, unique, efficient, nonobvious slip joints.

This invention resides not in any particular individual feature, but in the combinations of them herein disclosed and claimed and it is distinguished from the prior art in these combinations with their structures and functions. There have been outlined, rather broadly, features of certain embodiments of the invention in order that the detailed descriptions thereof that follow may be better understood, and in order that the present contributions to the arts may be better appreciated. There are, of course, additional features of the invention that will be described hereinafter and which may be in the subject matter of claims appended hereto. Those skilled in the art will appreciate that conceptions, upon which this disclosure is based, may readily be utilized as a basis for the designing of other structures, methods and systems for carrying out the purposes of the present invention. It is important, therefore, that the claims be regarded as including any legally equivalent constructions or steps insofar that they do not depart from the spirit and scope of the present invention.

The present invention recognizes and addresses the previously-mentioned problems and long-felt needs and provides a solution to those problems and a satisfactory meeting of those needs in its various possible embodiments and legal equivalents thereof. To one of skill in this art who has the benefits of this invention's realizations, teachings and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions of further improvements.

DESCRIPTION OF THE DRAWINGS

So that the manner in which the above-recited features, advantages and objects of the invention, as well as others which will become clear, are attained and can be understood in detail, more particular description of the invention briefly summarized above may be had by reference to certain embodiments thereof which are illustrated in the appended drawings, which drawings form a part of this specification. It is to be noted, however, that the appended drawings illustrate certain preferred embodiments of the invention and are therefore not to be considered limiting of its scope, for the invention may admit to other equally effective or equivalent embodiments.

FIG. 1 is a side view in cross-section of a tool according to the present invention.

FIG. 2 is a perspective view of part of the tool of FIG. 1.

FIG. 3 is a cross-sectional view along line 3-3 of FIG. 2.

FIG. 4 is a cross-sectional view along the line 4-4 of FIG. 1.

FIGS. 5A, 5B, 5C and 5D are schematic views showing steps in the assembly of the tool of FIG. 1.

FIG. 17 is a side view partially in cross-section of a tool according to this invention.

FIG. 18 is a side view of a tool according to this invention.

DESCRIPTION OF EMBODIMENTS PREFERRED AT THE TIME OF FILING FOR THIS PATENT

Figure 6:
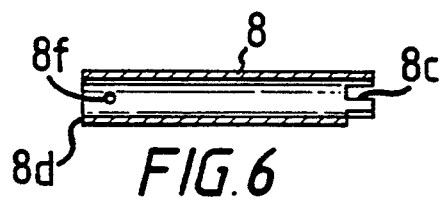
FIG. 6 is a side cross-section view of a part of a sensor of the tool of FIG. 1.
Figure 7:
FIG. 7 is an end view in cross-section of the sensor of FIG. 6.
Figure 8:
FIG. 8 is an end view in cross-section of a part of a sensor of the tool of FIG. 1.
Figure 9:
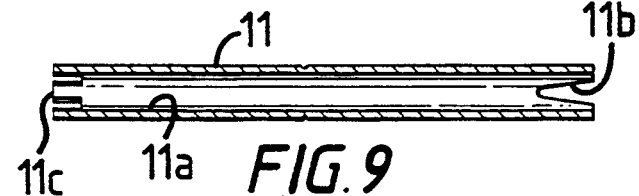
FIG. 9 is a side cross-sectional view of the sensor of FIG. 8.
Figure 10:
FIG. 10 is an end view of the other end of the sensor of FIG. 8.
Figure 11:
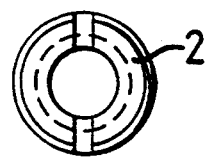
FIG. 11 is an end view of a cap of the tool of FIG. 1.
Figure 12:
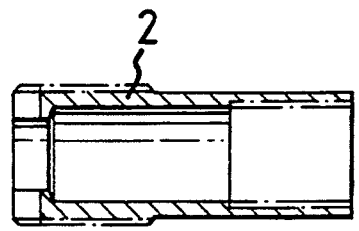
FIG. 12 is a side cross-sectional view of the cap of FIG. 11.
Figure 13:
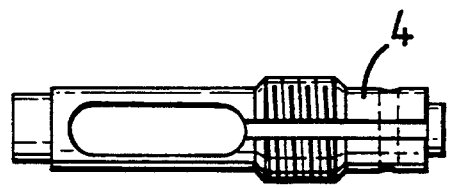
FIG. 13 is a top view of a carrier of the tool of FIG. 1.
Figure 15:
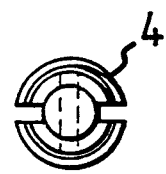
FIG. 15 is an end view of an end of the carrier of FIG. 11.
Figure 14:
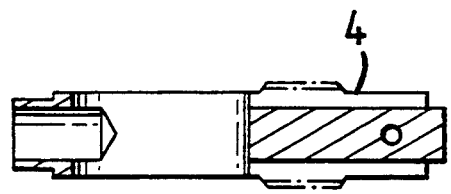
FIG. 14 is a side cross-sectional view of the carrier of FIG. 13.

Referring now to FIG. 1, a tool T according to the present invention has a sensor cartridge assembly A with two sensors, one for sensing torque or torsion and one for sensing compression or tension. The torque sensor includes a torque sensor coil 21 mounted on a torque coil support 6 and an upper rotary sensor 8 and a lower rotary sensor 11 with ends within the torque sensor coil 21. The tension sensor includes a stretch sensor coil 20 mounted on a stretch coil support 13 and a sensor core 16 partially within the stretch sensor coil 20. A sensor shaft 14 extends through both coils.

The two sensors operate autonomously. Torsion which affects the upper rotary sensor 8 does not affect the tension (or "stretch") sensor. Conversely, tension which affects the stretch sensor does not affect the torque sensor.

As shown in FIGS. 1 and 5, the sensor cartridge assembly A has a sensor core 16 attached to the sensor shaft 14 by a pin 7b. The sensor shaft 14 is slotted at the opposite end and axially runs through the center of both sensor sections. The sensor shaft 14 is then coupled to the upper rotary sensor 8 by friction between a pin 7 installed through the upper rotary sensor 8 and between the walls of a slot 14c in the sensor shaft 14. This slot and pin arrangement between the sensor shaft 14 and upper rotary sensor 8 isolate the torque sensor from axial motion, coupling only rotation of the sensor shaft 14 to the upper rotary sensor 8.

Pipe movement, both tensional or torsional, is directed towards the appropriate stretch or torque sensor. Axial movement of the sensor core 16 is detected as stretch displacement by the stretch sensor coil 20. Rotation of the upper rotary sensor 8 is detected as torque displacement by the torque sensor coil 21.

A stretch transducer is comprised of a solenoidal coil 20 and a moving core, part of the sensor core 16. The stretch sensor coil 20 is supported by a stretch coil support 13. Within the core of the sensor coil 20 is one end of the sensor core 16 and one end of the lower rotary sensor 11, separated by a small gap G. Both of these components are, preferably, made from a permeable material. The sensor shaft 14 that runs through the lower rotary sensor 11 and is attached to the sensor core 16 is made, preferably, from non-ferrous material. The lower rotary sensor 11 is, preferably, fixed in place and not allowed to move axially. The sensor core 16, typically attached to pipe, may move axially. This axial displacement of the sensor core 16 modulates the inductance of the stretch sensor coil 20 and resulting change in inductance is measured by surface equipment. The sensor core 16, preferably cylindrical in nature, is rotatable 360° without changing the inductance of the stretch sensor coil 20. Hence, the stretch sensor is immune from torque applied to the pipe.

A torque transducer comprises, preferably, two permeable tubes, the upper and lower rotary sensors 8 and 11, with slots or poles on their facing ends placed within the core of the solenoidal torque sensor coil 21. These pole ends are arranged so that their pole faces overlap each other axially, but are, preferably, restrained from touching each other, maintaining a measurable gap G between them. Retaining rings 10a and 10b are attached to both pole pieces so as to provide a suitable flange in which to separate the pole pieces. Teflon TM washers bracket the retaining rings and are compressed together and up against the pin face or bore flange of the torque coil support 6 by compression springs 12a and 12b. The torque coil support 6 also provides a base for the torque sensor coil 21.

The upper rotary sensor 8 is "keyed" to the sensor shaft 14 and rotates in direct relation to pipe movement. This rotation upsets or changes the amount of overlap or area of effacement of the pole pieces of the upper and lower rotary sensors 8 and 11 in linear fashion and is measured as a linear change in inductance of the torque sensor coil 21.

The lower rotary sensor 11 is held in place, prevented from rotating over a small range of input torque rotation or moving axially towards the stretch sensor coil 20 by the compression spring 12a acting upon the Teflon TM sandwiched retaining ring 10a. An alignment pin 7a installed through the sensor shaft 14 engaged within a delta slot 11b of the lower rotary sensor 11 contacts sloping walls of the slot as normally occurs when input torque rotation directs the alignment pin 7a to span the distance between the walls of the delta slot 11b. Upon contact with the walls of the delta slot by the alignment pin 7a and further input torque rotation, the lower rotary sensor 11 is spun around its axis, or around with the sensor shaft 14. The washers bracketing the retaining ring 10a permit near friction-free rotation of this pole piece in the manner described. Engagement of the alignment pin 7a with the walls of the delta slot serves to reorient or "reset" the torque sensor. FIGS. 2 and 3 indicate the pin-slot arrangement and the degree of movement provided thereby.

Proper alignment of the pole faces of both rotary sensor pieces is preferred for detection of both left and right hand torque. The delta slot 11b and alignment pin 7a limit the degree of radial displacement of the lower rotary sensor (which "floats" with some degree of freedom) relative to the faces of the upper rotary sensor (the present invention, in one embodiment, limits this radial displacement to approximately ± preferred 15°). A typical torque measurement begins with the pole faces oriented as shown in FIG. 4 with the alignment pin 7a in the middle of the delta slot 11b. Rotation of the sensor core 16 rotates the upper rotary sensor 8 and the alignment pin 7a within the delta slot 11b. Rotation of the upper rotary sensor 8 is measured as torque displacement so long as the lower rotary sensor 11 remains stationary. Once the alignment pin 7a engages a wall of the delta slot 11b, the upper and lower rotary sensor pole pieces rotate together, their degree of displacement fixed. The degree of fixed displacement is determined by the geometry of the delta slot and the axial position of the alignment pin within the slot. There is friction force between the pin 7 and the slot of shaft 14. The diameter of the pin and the dimensions of the slot feature on the end of the shaft are preferably selected so that there is friction contact between the members. The slotted shaft acts as a spring to maintain this friction. This is needed to prevent "slop" in the torque transducer. If there is slop in this area, rotation of the shaft may not rotate the upper rotary sensor 8 until a wall of the slotted shaft contacts pin 7 (inserted through the upper rotary sensor 14). If contact with the wall of the slot is not achieved, information about torque strain of a tubular member may be lost.

Spring 12b acting upon a PTFE sandwiched snap ring 37 (installed on the upper rotary sensor 8) forces the upper rotary sensor up against the shoulder of the torque coil support 6. Similarly, spring 12a acts upon the lower rotary sensor 11 to force it up against the pin shoulder of the torque coil support 6. With both rotary sensors forced into and held within the core of the torque coil support there is a measurable gap between the pole faces of each rotary sensor piece. This gap is preferably from about 5 to about 15 thousandths of an inch (for adequate operation, the pole faces do not touch each other). Achieving the proper gap dimensions is accomplished by adjusting the thickness of one or more PTFE washers that bracket the snap rings.

As shown in FIG. 1 and in Step 1 in FIG. 5, assembly of a bi-sensor cartridge assembly B according to the present invention begins by inserting an end of the sensor shaft 14 into a hollow end 16a of the sensor core 16 and pinning the two together with a pin 7b. A pin 7a is inserted into a hole 14a on the sensor shaft 14. Washers 9a and 9b, preferably made from a low friction material such as polytetraflouroethylene (PTFE) are disposed on either side of a collar 16c of the sensor core 16. An end 14b of the sensor shaft 14 with a slot 14c is inserted through an opening 13a into a channel 13b extending centrally through a stretch coil support 13. A retainer cap 15 is threadedly secured to the sensor core 16 with a portion 16b of the sensor core 16 protruding through an opening 15a in the retainer cap 15.

The collar 16c limits possible axial movement of the sensor core 16 with respect to the retainer cap 15 and pin flange of the stretch coil support 13, and therefore limits axial movement of the sensor core 16 and of the sensor shaft 14 with respect to the stretch sensor coil 20.

As shown in Step 2 of FIG. 5A, the end 14b of the sensor shaft 14 is inserted into a lower rotary sensor 11 with a central channel 11a therethrough, a delta slot 11b at one end, and slots 11c at an end 11e. A spring 12a is inserted around the lower rotary sensor 11 and into the stretch coil support 13 to abut an interior shoulder 13c of the stretch coil support. A washer, 9c, preferably of PTFE is inserted around the sensor shaft 14 and abuts the spring 12a. A snap ring 10 installed in a groove 11d on the lower rotary sensor 11 abuts the washer 9c and the pin 7a is disposed in the delta slot 11b. A washer 9d, preferably of PTFE, abuts the snap ring 10a. The spring 12a limits movement of the lower rotary sensor 11 with respect to the sensor shaft 14 (to the right as viewed in FIG. 5B). The end 14b of the sensor shaft 14 is inserted into a central channel 6a of a torque coil support 6. The end 11e of the lower rotary sensor 11 projects into the channel 6a.

As shown in Step 3, FIG. 5, a snap ring 10b is installed in a groove 8a on an upper rotary sensor 8. An end 8b of the upper rotary sensor 8 with slots 8c therein is inserted through a washer 9e, preferably of PTFE, and an end 8d of the upper rotary sensor 8 is inserted into a washer 9f, preferably of PTFE. The snap ring 10b will abut both washers 9e and 9f. The end 14b of the sensor shaft 14 is inserted through a central channel 8e extending through the upper rotary sensor and a pin 7c through a hole 8f is disposed for reception in and for movement in the slot 14c of the sensor shaft 14. The end 8b of the upper rotary sensor 8 is disposed adjacent the end 11e of the lower rotary sensor 11 within the channel 6a of the torque coil support 6. Movement of the upper rotary sensor with respect to the sensor shaft in one direction (to the right as viewed in FIG. 5) is limited by the bore flange of the torque coil support 6. The only allowed axial motion of the upper rotary sensor is to the left as viewed in FIG. 5C; however, this axial motion is prevented by the spring acting upon the PTFE sandwiched snap ring and the assembly is forced up against the bore flange of the torque coil support 6. A spring 12b disposed about the upper rotary sensor 8 abuts the washer 9f at one end and a shoulder 4a of an electronic carrier 4 at the other end. The spring 12b limits movement of the upper rotary sensor in the other direction (to the left in FIG. 5A) and helps maintain the pin 7c disposed in the slot 14c as well as assisting in maintaining a desired gap between the end 8b of the upper rotary sensor and the end 11e of the lower rotary sensor. The end 14b of the sensor shaft 14, the end 8d of the upper rotary sensor, and the spring 12b are disposed within a channel 6b of the torque coil support 6. The electronic carrier 4 is secured to the torque coil support 6 with a pin 5 that extends through a hole 6d in the torque coil support and a hole 4b in the electronic carrier 4. A bridge rectifier (e.g. a diode switching bridge) 3 is disposed in a slot 4c in the electronic carrier 4 and wires from the two coils (see FIG. 1) go through a slot 4e to the bridge 3. A PTFE insulated feed through terminal 1 has a pin 1a extending into the slot 4c, a PTFE body 1b disposed in a channel 4d, and an end 1c of the pin 1a which extends beyond the carrier 4. A cap 2 is secured over the carrier 4 to the torque coil support 6 (e.g. by threaded engagement).

As shown in FIG. 1, the switching bridge 3 has a positive connection 3a, a negative connection 3b, a ground connection 3c soldered at 3d to the carrier 4, and a connection 3e from which extends a wire 3f to the pin 1a. An insulated wire 20b extends from the stretch sensor coil 20, to the slot 4e, and to the positive connection 3a. An insulated wire 21b extends from the torque sensor coil 21, to the slot 4e, and to the negative bridge connection 3b. A wire 3g extends from the ground connection 3c to the point 3d. Current from a surface source (e.g. interrogating current) flows through the assembly via the pin 1a and the wire 3f. The signal from the surface can be AC or DC current. Use of DC current allows for interrogation of one or more sensors. By using a plurality of zener diodes are connected in series with a plurality of sensors, e.g. three or more, and the zener diodes are rated at various different increasing voltages, then each sensor can be individually interrogated. For example, in one embodiment in which three zener diodes are connected in parallel and rated 5 volts, 10 volts, and 15 volts respectfully, the 5 volt diode will conduct only after 5 volts is impressed across it. This same 5 volt voltage is felt across the other zener diodes; however, the level of voltage to "turn them on" has not been exceeded so ideally no current flows through them. A first sensor connected in series with the 5 volt zener diode is activated so long as 5 volts is impressed across the zener diodes. If 15 volts or more is impressed across the parallel connected zener diodes, all three diodes conduct current. With three sensors connected in series with all three zener diodes sensing is possible with all three sensors. Preferably the sensors become passive or unchangeable after they are energized; hence, in the configuration above after application of 5 volts to the zener diodes the first sensor provide information about itself through the zener diode rated at five volts and then ceases to become active upon the application of higher voltages. After application of 10 volts, two sensors are seen, but one has ceased to become active; therefore, only the 10 volt sensor is detected and then also becomes passive or ceases to be active. The process repeats for the 15 volt zener diode.

FIG. 4 depicts an axial view of both rotary sensor pole pieces imposed on each other. Each sensor pole piece end within the torque sensor coil has one or more indented areas. Several indented areas result in a "fingered" sensor pole piece end. As shown the upper rotary sensor's pole piece end within the torque sensor coil has four fingers 50 and the lower rotary sensor's pole piece end within the torque sensor coil has four fingers 52. The faces of the fingers of the rotary sensors' pole pieces are crosshatched differently to clarify the area of overlap between the rotary sensor pieces. Because of the arrangement of the pole pieces, right or left hand torque rotation is discernable. In this embodiment, right hand sense rotation enlarges the area of finger effacement and is measured as an increase in inductance of the torque sensor coil 21; and conversely, left hand sense rotation decreases the area of finger effacement and is measured as a decrease in inductance of the torque sensor coil 21. The change in area is linearly proportional to input torque rotation; hence, the change in inductance of the torque sensor coil 21 is linear.

Sensitivity of the torque sensor can be increased by increasing the number of fingers or poles that efface each other. With one finger on each pole piece, i.e. with the two semicircles that efface each other, the semicircles can form a circle or a semicircle as one is rotated with respect to the other. They rotate exactly 180° from no effacement to full effacement. If each semicircle is split into two components (like slices of pie) and symmetrically arranged to form a circle or four pieces of a pie, there is no effacement of any of the slices (total of four). Rotation of two symmetrical slices against the other two slices result in more overlap of the areas and full effacement after 90° of rotation. Thus there is a linear relationship between the number of poles and degree of maximum rotation between no effacement to full effacement. This translates into increased sensitivity to pipe rotation. The relationship between maximum torque measurement and number of poles is:

maximum torque range—360°/number of poles

One embodiment of the present invention employs four fingers or poles on each rotary sensor piece. Hence, 360° divided by a total of eight pole pieces equals a maximum sensing range of 45° (or ±22.5°). Doubling the number of pole pieces of this embodiment of the present invention results in a maximum sensing range of 22.5°, and so forth. The same inductance value is reached for the full effacement of a two pole system as it will for an eight pole system of any other number of poles; conversely, the same inductance value will be reached for no effacement of any number of symmetrically arranged poles.

The sensor core 16 and the sensor shaft 14 are permitted to move axially (left-to-right as viewed in FIG. 1) to the extent permitted by the open area around the collar 16c. Movement of the sensor core 16 in the stretch sensor coil 20 changes the coil's inductance. Inductance of the stretch sensor coil is inversely proportional to the length of gap G between the sensor core 16 and one end of the lower rotary sensor 11 (end containing delta slot feature 11b). A smaller gap means a larger coil inductance and vice versa. Axial movement of the sensor core 16 from left-to-right as viewed in FIG. 1 is referred to as "Stretch or Tension measurement" and would be measured as a decrease in coil inductance as the length of the gap G is increased. Such movement of the sensor core is isolated from the upper rotary sensor 8 and the lower rotary sensor 11 since there is no connection between the sensor core 16 and the upper and lower rotary sensors as previously described and no connection between the sensor shaft 14 and the upper and lower rotary sensors that prevents the limited axial movement; i.e. when the sensor core 16 moves axially (to the limited extend allowed) the upper and lower rotary sensors do not move axially. For the embodiment shown the gap G ranges between one sixteenth and one eighth inches and is most preferably maintained at three thirty secondths of an inch.

The upper rotary sensor 8, with its ends 8b is free to move radially with respect to the lower rotary sensor 11; the effacement area of the sensor ends co-act to alter the inductance of the torque sensor coil 21. The upper rotary sensor rotationally moves with the sensor shaft 14 (and sensor core 16) due to the co-action of the pin 7c and the slot 14c previously described. Such rotation of the rotary sensor does not alter the inductance of the stretch sensor coil due to the cylindrical design of the sensor core 16 and the physical separation of the stretch and torque sensor coils.

The torque sensor is "reset" with the aid of the delta slot 11b and alignment pin 7a. By axially stroking the sensor core 16 (i.e., by mechanically lowering and raising a wireline cable attached to a freepoint string of tools), thereby stroking the alignment pin 7a within the delta slot 11b, the lower rotary sensor 11 rotates towards a neutral or starting point (as shown in FIG. 3) as the pin 7a engages a wall of the delta slot 11b. Alternatively, the alignment pin 7a can remain stationary and the lower rotary sensor can be stroked toward the stretch sensor section. Again, the delta slot 11b will contact the alignment pin 7a and rotate the lower rotary sensor 11 towards neutral. ("Neutral" means a mid-range position relative to the overall torque limit. A mid-range position in the present invention implies that after the completion of a resetting operation, performed electrically or mechanically, the alignment pin 7a will be positioned along an axial line drawn through the apex of the delta slot 11b.) Axial stroking of the lower rotary sensor 11 requires the force of a compression spring 12a to be overcome.

The stretch sensor coil 20 provides sufficient electromagnetic force to reset the torque sensor by moving the lower rotary sensor 11 into the stretch sensor coil 20 and is electrically energized from surface equipment (not shown). Upon the electromagnetic engagement of the stretch sensor coil 20 by surface equipment, a small separation between the sensor core 16 and lower rotary sensor 11 within the core of the stretch sensor coil 20 is reduced as the lower rotary sensor is magnetically attracted towards the fixed sensor core 16. This attractive force between the sensor core 16 and the end of the lower rotary sensor 11 is of sufficient strength to compress the coil spring 12a and allow the lower rotary sensor 11 to be stroked, forcing the delta slot 11b against the alignment pin 7a. This reorients the lower rotary sensor 11 with respect to the upper rotary sensor 8 (rotates towards neutral). The reset operation is completed when energizing current is removed from the stretch sensor coil 20, thereby allowing the compression spring 12a to axially return the properly aligned lower rotary sensor 11 up against the pin flange of the torque coil support 6, reestablishing the same measurable gap G between the upper and lower rotary sensor pole pieces.

The present invention provides for a mechanical and an electrical means to reset the torque transducer. The device (or freepoint tool) can be reset from the surface by either manually stroking the device or by the electromagnetic engagement of the stretch sensor coil 20. The stretch sensor is mechanically reset. Procedurally, the sensor core 16 is stroked to either end of its allowed displacement. In one typical application, a wireline string of tools is lowered in the well and by this action moves the sensor core 16 further into the core of the stretch sensor coil 20 to a fixed reference point. The device is prepared to measure stretch of pipe as it is tensionally strained from the surface. Conversely, the freepoint string is raised by the wireline thereby moving the sensor core 16 to its other extreme end permitting measurement of compression of pipe.

Figure 16:
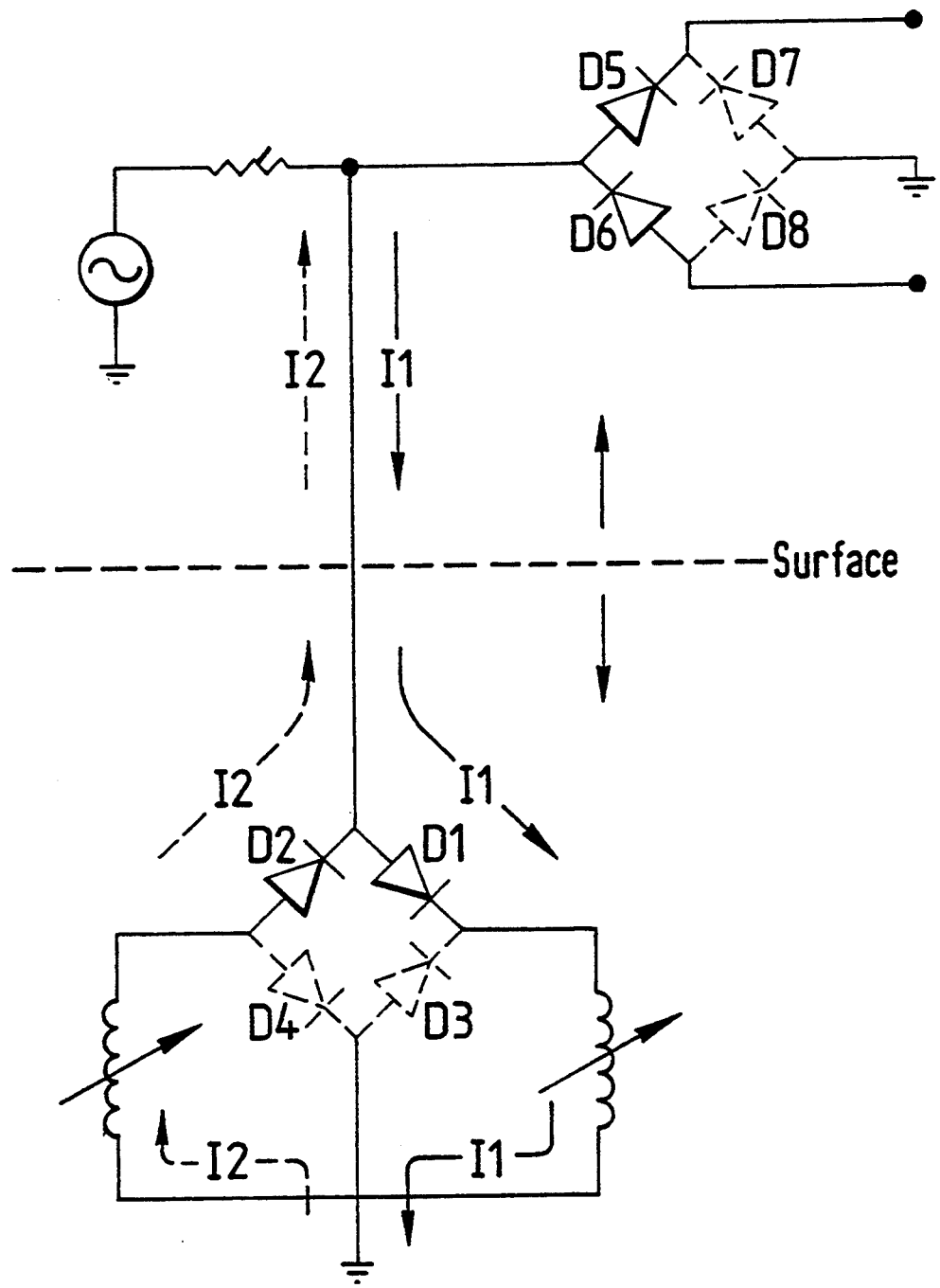
FIG. 16 is a schematic view of certain components of a system according to the present invention using a tool as in FIG. 1.

Both sensors may be passively interrogated by surface equipment over a single conductor wireline cable, without the need for a downhole oscillator or any other actively powered downhole electronics. A simple switching diode bridge 3 incorporated into the cartridge, operates in synchronous fashion with diode switches contained in a surface located freepoint receiver. This electronic switching technique permits the separate and simultaneous discrimination of torque and stretch transducer signals from surface equipment, and is schematically represented in FIG. 16. The signal applied at the surface can be bipolar (an AC signal) or unipolar (a DC pulse) and these signals may be generated by a variety of equipment which is not limited to only alternating current signal generators. Other equipment that may be used includes a pulse generator or a variable DC power supply.

As shown in FIG. 16, with proper surface signal excitation of the downhole tools, discrete diodes within the switching diode bridge 3 are either turned on or off, like a switch. Assuming a fixed positive voltage, with respect to chassis ground, is applied to the wireline, a current, I1, flows from the signal generator, through the load resistor, down the wireline, through a "forward biased" diode D1, through the stretch sensor coil, and then back to the signal generator through the ground leg or armor of a wireline cable. Changes in the inductance of the stretch sensor coil alter the amount of current flow through the wireline and the amount of current flow is monitored at the surface through another switching diode D5, since this diode is also forward biased with respect to ground.

A measurable direct current voltage is then available from the cathode of diode D5 that varies in direct proportion to the amount of current flow allowed by the stretch sensor coil. Information is then displayed about stretch displacement on analog meters, digital panel meters, or is "quantized" for use in a digital acquisition system after filtering and amplification of the stretch detected voltage. Similarly, information about the torque sensor is obtained by reversing the voltage imparted on the wireline by the signal generator. With a negatively swinging voltage applied to the wireline, a current, I2, flows in a direction opposite of current I1 through biased diode D2. A measurable direct current voltage is then available from the cathode of D6. This voltage varies in direct proportion to the amount of current flow, I2, allowed by the torque sensor coil. Pipe movement, either torsional or tensional, is transmitted to an appropriate torque or stretch sensor section.

As shown in FIGS. 17 and 18 cartridge 100 according to the present invention as shown in FIGS. 17 and 18 (like the assembly A, FIG. 1) is installed into a properly bored and threaded freepoint tool housing 102. This body or housing 102 accommodates the cartridge 100 by providing physical protection from well bore fluids and the apparatus to transmit mechanical movement of pipe in the wellbore to be examined to the cartridge 100. The cartridge 100 is inserted into the housing 102 until its sensor core 103 (like the sensor core 16) mates with a press fit with a mandrel connector 104 attached to the end of a mandrel shaft 105 running through the housing 102. The cartridge 100 is then retained in place by a belleville washer 106 and locknut 107. Installation of a feed-thru connector 108 (like the terminal 1) and an upper sub 109 completes the assembly of the tool. The upper sub 109 has an O-ring seal 133 which seals the tool's interior from the outside environment. The mandrel shaft 105 extends through a flexible fluid seal 110 and a fluid seal block 111. A protective shield 112 shields the seal and seal block Once connected to the sensor core extending from the cartridge assembly 100, the mandrel shaft 105 moves as the sensor core moves (e.g. typically with a one-fourth inch stroke and most preferably with a one-sixteenth inch stroke and with rotation through a full three hundred and sixty degrees). No calibration of the assembled tool is required. A collar 117 at the bottom of the mandrel 105 in combination with the mandrel connection 104 serves to retain the mandrel within the housing. In one embodiment measurement of stretch of about 0.020 inches is sufficient for an indication of tension on a tubular. A stroke of 0.030 inches is more than adequate for such a tool. Once the tool is assembled, turning the cartridge assembly forces the sensor core 16 into the mandrel connector 104 and then backing the cartridge assembly out of the housing one and one half turns correctly positions the sensor core 16. Preferably the tool is filled with silicon oil before the upper sub is installed.

Figure 19:
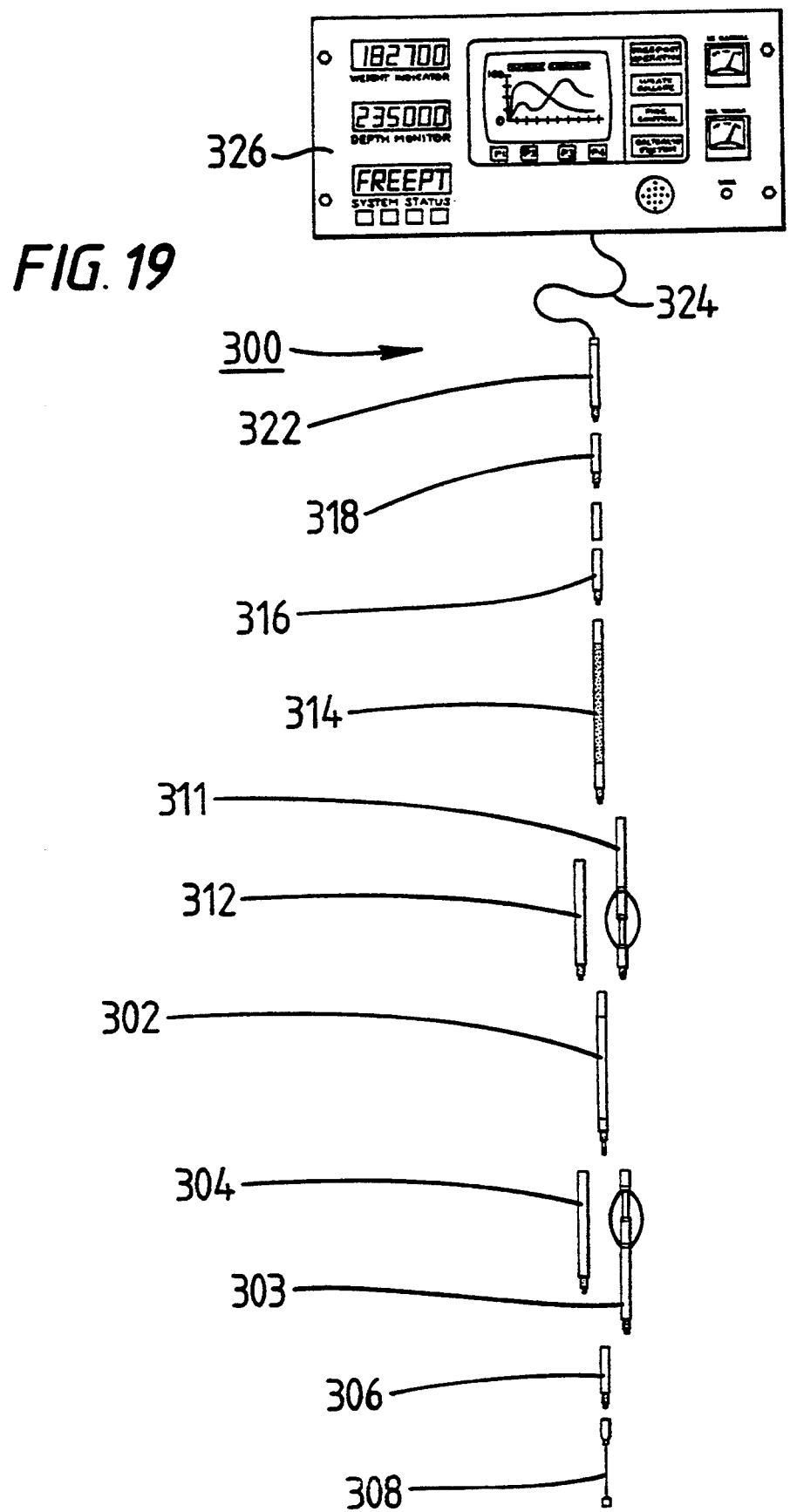
FIG. 19 is a exploded schematic view of a system according to this invention.
Figure 20:
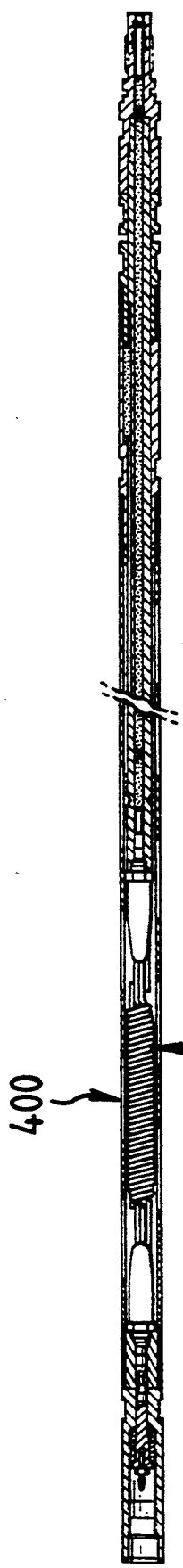
FIG. 20 is a side view in cross-section of a slip joint according to the present invention.
Figure 21:
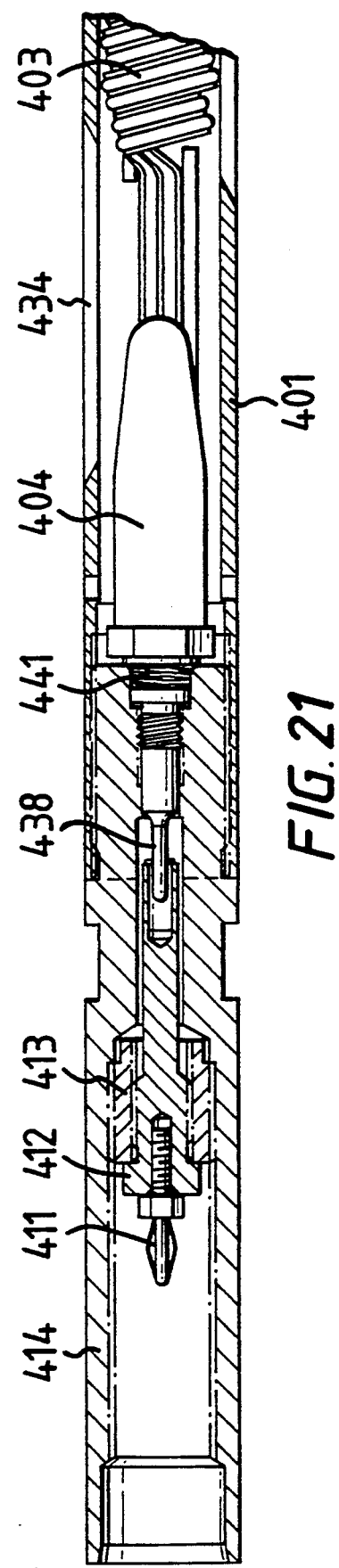
FIG. 21 is an enlarged view of a portion of the slip joint shown in FIG. 20.
Figure 22:
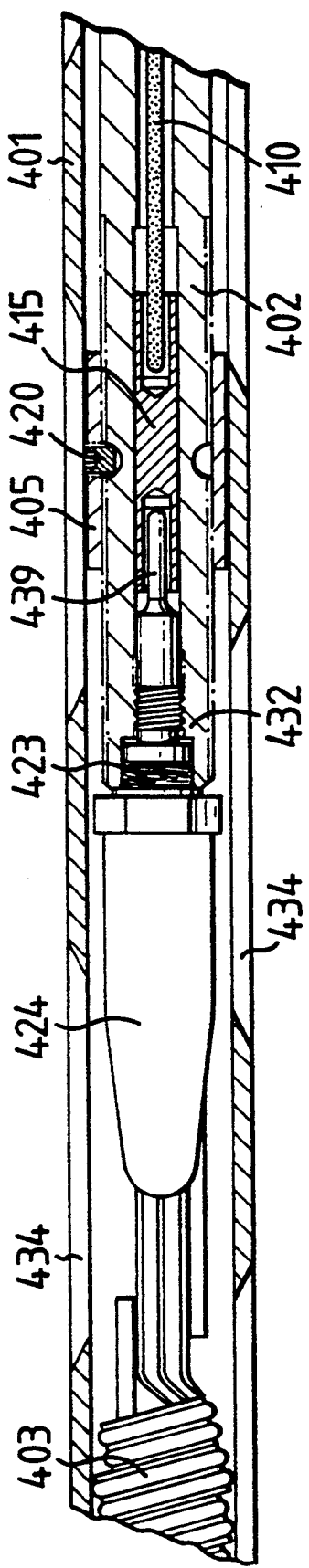
FIG. 22 is an enlarged view of a portion of the slip joint shown in FIG. 20.
Figure 23:
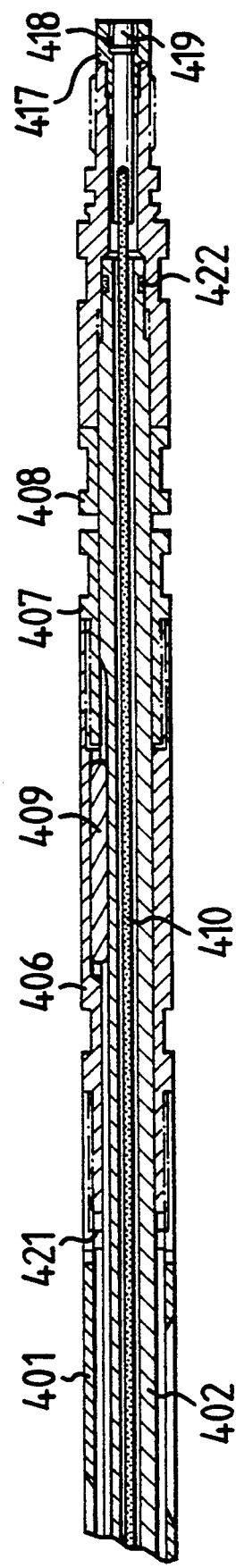
FIG. 23 is an enlarged view of a portion of the slip joint shown in FIG. 20.

FIG. 19 illustrates a system 300 according to the present invention which includes a tool 302 like the cartridge/housing device of FIGS. 17 and 18. Beneath the tool 302 a lower magnetic anchor 304 for anchoring the tool 302 to a pipe's interior (or a lower bow spring 303) may be used. A safety sub 306 is connected to the lower magnetic anchor 304 (or lower bow spring 303) to serve as a connector for a conventional shot bar 308 which is used to jar a joint loose for a typical backoff operation. A backoff operation is the purposeful detonation of explosive prima-cord by a blasting cap to jar a tubular connection free. Prior to detonation, left hand torque (or right hand torque for left handed pipe) is put into the connection and weight is set (at the block) such that the tubular is neutral (not in tension or compression, slight tension is allowed and at times maybe preferable) at the connection to be unscrewed. Ignition of the prima-cord jars the connection and the joint spins free due to the backoff torque previously put into the tubular connection. A backoff operation is completed by unscrewing the connection and separating the string from another member, e.g. a fish, left in the hole.

Immediately above the tool 302 is connected an upper magnetic anchor 312 for anchoring the tool 302 within a tubular such as a stuck pipe (or an upper bow spring 311 is used). A slip joint 314 is connected to the upper magnetic anchor 312 (or upper bow spring 311) to provide play in the tool string to allow a wireline therein to "float" without snapping and allows the tool 302 to be stabilized below the slip joint, allowing the wireline to float above the slip joint. Preferably two electrical circuits are provided through the slip joint 314 by a two conductor coil cord assembly with integrated coaxial connectors at each end, providing a core (center pin) and a ground (return) electrical connection between each end (i.e. pin of one connector to pin of the other connector, ground side of one connector to ground side of the other connector). It is preferable to physically connect the sliding members of the slip joint 314, (a mandrel and housing) by an electrical wire connection rather than depend upon friction contact between the two sliding components to provide a reliable ground connection. Furthermore, use of integrated connections on the coil cord assembly permit quick replacement of the component in field operations and also ensures a more positive connection sealing out well fluids from the electrical circuits contained within the assembly. One or more sinker bars 316 are used in the tool string as needed and a conventional collar locator 318 is used to locate joint collars to properly locate the tool 302. A conventional cable head 322 connected to the collar locator provides a mechanical attachment between a wireline 324 and the tool 302. The wireline 324 may be a conventional single conductor wireline cable extending down to the tool 2302 through the various interconnected parts of the tool string and to a surface control and signal system 326 which sends interrogating signals down to the tool 302; receives and records signal responses from the tool 302; displays tool depth, system status. A freepoint receiver may display tool depth, system status (i.e. freepoint operation, collar logging, or backoff operation in progress, power supply failure, calibration in progress, etc), time, date, provide hard copy outputs of freepoint readings, provide a hard copy output of a collar log, store all measurements on magnetic media for storage and retrieval purposes, and so forth. Preferably two connections at the slip joint include: a connection for the primary signal path and a connection for ground return to insure a good circuit for the signal from the sensor core to the signal system 326.

Due to the relationship between changes in electrical resistance of a conductor such as a wire in response to changes in temperature, the coils used in the present invention may be employed to measure temperature and temperature change downhole in a wellbore. Over a moderate temperature range (e.g. 100° C.), the change in resistance of either sensor coil will be proportional to the change in temperature at a downhole location. Temperature at a downhole location (T2) is referenced to some other known temperature (T1) at which a proportionality constant ($a_{t1}$) has been experimentally obtained for the material used in the coil windings, and where a known resistance ($R_{t1}$) was obtained for the coil windings. As downhole coil resistance ($R_{t2}$) is monitored, downhole temperature can be calculated from the relationship:

$$R_{t2}=R_{t1}[1+a_{t1}(T2-T1)]$$

For extended temperature ranges (greater than 100° C.) the relationship above may be modified to account for non-linear changes in the material properties of the coil windings. In general, the technique to measure temperature over extended ranges is the same as the linear model shown above to compute downhole temperatures from a coil resistance. Either coil (or both) shown in FIG. 1 may be interrogated to produce a signal indicative of temperature.

Referring now to FIGS. 20–23, a slip joint 400 according to this invention has a housing 401, a mandrel 402, and a two conductor coil cord assembly 433 with both the mandrel and the cord assembly movable from end to end in the housing.

The housing 401 is approximately four feet long in one preferred embodiment and is threaded at each end to accept a pin connection. The housing 401 is slotted throughout its length with slots 434 to allow easy flow of well fluids through its inner chamber. In one embodiment there are six rows of fourteen slots radially spaced about 60° apart with slots approximately 1½ inches long. Each row of slots is preferably offset from the other to preserve strength in the housing 401.

The mandrel 402 operates within the housing 401 and is prevented from being extracted from the housing 401 by the abudment of a mandrel bushing 405 (screwed unto the mandrel 402 and retained by a set screw 420 up against a pin flange 421 of a keyway sub 406. Conversely, the mandrel 402 collapses into the housing 401 until a keyway locknut 407 and a locknut 408 make contact. The mandrel 402 is prevented from rotating within the housing 401 by a pin or key 409 that rides within a milled region of the mandrel 402 and keyway sub 406. This arrangement allows only lineal stroking of the mandrel 402 within the housing 401. This rotational restriction prevents undesired coiling up or uncoiling of the two conductor coil cord assembly 433. One end of the mandrel is grooved to accept an O-ring seal 422 and is threaded into a pin sub 416, sealing out well fluids from entering the inner bore of the mandrel 402. The other end of the mandrel 432 is machined to accept one end 422 of the two conductor coil cord assembly 433 and is also sealed from well bore fluids by an o-ring seal 423.

The two conductor coil cord assembly 433 consists of a two conductor coil cord 403 integrated with fluid seal connectors 404 and 424 at its ends. The mandrel 402 and coil cord assembly are free to stroke within the housing 401 over a desired length, e.g. in one embodiment a length of approximately 20 inches The two conductor coil cord assembly 433 in combination with other electrically conductive components provides for two separate electrical circuits through the Slip joint assembly or tool.

The primary or core electrical circuit path begins with a banana plug 411 and an insert 412 located within a box sub 414. An insulator 413 supports the insert-/banana plug assembly as well as providing electrical isolation from the box sub 414. The core or center connection 438 (e.g. a metallic pin) of the fluid seal connector 404 mates with the insert 412. The primary circuit continues through the coil cord assembly to a core connection 439 of the other fluid seal connector 424. A pin contact 415 mates with the center contact of the fluid seal connector 424 and with one end of a contact rod 410. The contact rod 410 is, preferably, sleeved with PTFE tubing (not shown) to electrically isolate the primary circuit from the mandrel 402. The contact rod 410 is soldered to an insert 419 located within the pin sub 416 which provides for electrical connection to other freepoint tool components (e.g. by a banana plug within a mating box connection). An insulator 417 supports the insert and provides electrical isolation from the pin sub 416. The insert 419 is retained in the insulator 417 by a spirol pin 418.

A secondary electrical pathway, or ground (return) leg, is from the box sub 414 to the mandrel 402. Connection between the box sub 414 and mandrel 402 is provided by one wire of the two conductor coil cord assembly 433. This pathway is from the fluid seal connector 404 through the coil cord 403 and to the other fluid seal connector 424. The shell of each fluid seal connector mates with the box sub or mandrel by a threaded connection with integrated O-ring seals 423 and 441 to prevent entrance of well fluids into the mating connections. This method of providing a physical and an electrical connection between the sliding members of slip joint ensures a positive and secure ground connection, rather than depend upon friction contact between the mandrel 402, pin or key 409, and housing 401.

In conclusion, therefore, it is seen that the present invention and the embodiments disclosed herein and those covered by the appended claims are well adapted to carry out the objectives and obtain the ends set forth. Certain changes can be made in the described and in the claimed subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form its principles may be utilized.

What is claimed is:

1. A torque sensor for sensing torque on a tubular member, the torque sensor removably disposable within the tubular member and securably interconnectible with an interior surface of the tubular member, the torque sensor comprising
   two sensor elements including a first sensor element and a second sensor element,
   a torque sensor electrical coil,
   the first sensor element comprising a first tube having a fingered first end and a second end, the first sensor element's tube's first end disposed within the coil,
   the second sensor element comprising a second tube, the second sensor element's second tube having a fingered first end and a second end, the second sensor element's second tube's first end movably disposed within the coil, rotation of the second sensor element's second tube effecting rotation of the second sensor element's second tube's first end within the coil,
   interconnection means for releasable interconnection of the second sensor element's second tube's second end with the interior surface of the tubular member so that torque applied to the tubular member effects rotation of the interconnection means which in turn rotates the second tube of the second sensor element and changing orientation of the first end of the second sensor element's secaond tube with respect to the first end of the first sensor element's first tube thereby changing electrical inductance of the coil, and
   transmission means attached to the coil for transmitting an electrical interrogating signal applied to the coil and for transmitting a response signal from the coil which is indicative of a level of electrical inductance of the coil.

2. The torque sensor of claim 1 further comprising
   isolation apparatus for isolating the sensor elements from tension applied to the torque sensor.

3. The torque sensor of claim 1 further comprising
   mechanical reset apparatus for mechanically resetting the torque sensor, and
   electrical reset apparatus for electrically resetting the torque sensor.

4. The torque sensor of claim 1 further comprising
   a gap between the fingered ends of the two sensor elements.

5. The torque sensor of claim 4 wherein the gap is between about 5 to about 15 thousandths of an inch in width.

6. The torque sensor of claim 1 further comprising
   each fingered end of each sensor element having spaced apart fingers, and
   the torque sensor having a sensing range not exceeding forty five degrees.

7. A bi-sensor assembly for sensing tension and torsion on a tubular member, the bi-sensor assembly removably disposable within the tubular member and securably interconnectible with an interior of the tubular member so that tension or torsion applied to the tubular member are transmitted to the bi-sensor assembly, the bi-sensor assembly comprising
   a main body,
   a torque sensor comprising two sensor elements including a first sensor element and a second sensor element,
   a torque sensor electrical coil on the main body,
   the first sensor element comprising a shaft having a fingered first end and a second end, the first sensor element's shaft's first end disposed within the coil,
   the second sensor element comprising a shaft, the second sensor element's shaft having a fingered first end and a second end, the second sensor element's shaft's first end movably disposed within the coil, rotation of the second sensor element's shaft effecting rotation of the second sensor element's shaft's first end within the coil,
   rotation of the shaft of the second sensor element changing orientation of the first end of the second sensor element with respect to the first end of the first sensor element thereby changing electrical inductance of the torque sensor electrical coil, and
   transmission means attached to the torque sensor electrical coil for transmitting an electrical interrogating signal to the torque sensor electrical coil and for transmitting a response signal from the torque sensor electrical coil which is indicative of a level of electrical inductance of the torque sensor electrical coil, a tension sensor comprising a tension sensor coil on the main body, a tension sensor element partially and movably disposed within the tension sensor coil, and interconnection means for releasably interconnecting the torque sensor and the tension sensor element with the interior surface of the tubular member so that tension applied to the tubular member effects movement of tension sensor element within the tension sensor coil thereby varying electrical inductance of the tension sensor coil, and so that torque applied to the tubular member effects rotation of the second sensor element of the torque sensor without affecting tension measurement by the tension sensor.

8. The bi-sensor assembly of claim 7 further comprising isolation apparatus for isolating the sensor elements from tension applied to the torque sensor.

9. The bi-sensor assembly of claim 7 further comprising mechanical reset apparatus for mechanically resetting the torque sensor, and electrical reset apparatus for electrically resetting the torque sensor.

10. The bi-sensor assembly of claim 2 further comprising a gap between the fingered ends of the two sensor elements.

11. The bi-sensor assembly of claim 2 further comprising each fingered end of each sensor element having spaced apart fingers, and the torque sensor having a sensing range not exceeding forty five degrees.

12. The bi-sensor assembly of claim 2 wherein the tension sensor element has a range of motion up to 0.030 inches.

13. The bi-sensor assembly of claim 2 further comprising mechanical reset apparatus for mechanically resetting the tension sensor.

14. The bi-sensor assembly of claim 2 further comprising a shaft partially extending from the main body and connected to the tension sensor element, the shaft interconnectible to the tubular member so that tension on the tubular member is transmitted by the shaft to the tension sensor element.

15. The bi-sensor assembly of claim 2 further comprising connection apparatus for interconnecting the main body of the bi-sensor assembly in an underground string of members and to the tubular member, a surface interrogator for interrogating the torque sensor and the tension sensor, the surface interrogator located on a surface above ground, and wiring apparatus interconnecting the main body and the surface interrogator.

16. The bi-sensor assembly of claim 20 further comprising interrogation apparatus in the surface interrogator for independently interrogating each of the torque sensor and tension sensor.

17. The bi-sensor assembly of claim 21 wherein power for the surface interrogator is supplied to the surface interrogator at the surface.

18. The bi-sensor assembly of claim 2 further comprising apparatus for monitoring electrical resistance of at least one of the electrical coils.

19. A system for determining the location of a pipe stuck in a wellbore, the system insertable into the pipe and comprising a tubular bi-sensor assembly, anchoring apparatus secured to the bi-sensor assembly for anchoring the system in the pipe, and a slip joint connected to anchoring apparatus secured above the bi-sensor assembly, the bi-sensor assembly comprising a main body, a torque sensor comprising two sensor elements including a first sensor element and a second sensor element, a torque sensor electrical coil on the main body, the first sensor element comprising a shaft having a fingered first end and a second end, the first sensor element,s shaft's first end disposed within the coil, the second sensor element comprising a shaft, the second sensor element's shaft having a fingered first end and a second end, the second sensor element's shaft's first end movably disposed within the coil, rotation of the second sensor element's shaft effecting rotation of the second sensor element's shaft's first end within the coil, rotation of the shaft of the second sensor element changing orientation of the first end of the second sensor element with respect to the first end of the first sensor element thereby changing electrical inductance of the torque sensor electrical coil, and transmission means attached to the torque sensor electrical coil for transmitting an electrical interrogating signal to the torque sensor electrical coil and for transmitting a response signal from the torque sensor electrical coil which is indicative of a level of electrical inductance of the torque sensor electrical coil, a tension sensor comprising a tension sensor coil on the main body, a tension sensor element partially and movably disposed within the tension sensor coil, and interconnection means for releasably interconnecting the torque sensor and the tension sensor element with the interior surface of the tubular member so that tension applied to the tubular member effects movement of tension sensor element within the tension sensor coil thereby varying electrical inductance of the tension sensor coil, and so that torque applied to the tubular member effects rotation of the second sensor element of the torque sensor without affecting tension measurement by the tension sensor the slip Joint comprising a hollow housing having two ends, a mandrel movably mounted in the housing for movement back and forth therein, a cord assembly connected at one end to the mandrel, the cord assembly movable with the mandrel within the housing, and two separate electrical circuits from one end of the housing to the other.

* * * * *